United States Patent [19]

Reynolds et al.

[11] 4,351,152
[45] Sep. 28, 1982

[54] ELECTRONIC CONSTANT SPEED CONTROL FOR A HYDROSTATIC TRANSMISSION

[75] Inventors: Richard W. Reynolds; Allen Myers, both of Ames, Iowa; Daniel J. Foley, Westminster, Mass.

[73] Assignee: Sundstrand Corporation, Rockford, Ill.

[21] Appl. No.: 78,022

[22] Filed: Sep. 24, 1979

[51] Int. Cl.³ .......................................... F16H 39/46
[52] U.S. Cl. ................................... 60/395; 60/448; 60/449; 60/DIG. 2
[58] Field of Search .................. 60/443, 448, 449, 445, 60/395, DIG. 2

[56] References Cited

U.S. PATENT DOCUMENTS

| | | | |
|---|---|---|---|
| 2,939,285 | 6/1960 | Hawkins et al. | 60/395 |
| 2,946,194 | 7/1960 | Westbury | 60/448 X |
| 2,977,765 | 4/1961 | Fillmore | |
| 3,319,419 | 5/1967 | Hann | |
| 3,438,201 | 4/1969 | Nash et al. | 60/395 |
| 3,529,422 | 9/1970 | Herndon, Jr. | 60/395 |
| 3,572,959 | 3/1971 | Shaughnessy | 60/DIG. 2 |
| 3,628,330 | 12/1971 | Miller | 60/DIG. 2 |
| 3,667,225 | 6/1972 | Karman | 60/DIG. 2 |
| 3,738,110 | 6/1973 | Grosseau | 60/DIG. 2 |
| 3,748,857 | 7/1973 | Heiser | 60/388 |
| 3,901,031 | 8/1975 | Knapp et al. | 60/443 X |
| 3,914,938 | 10/1975 | Cornell et al. | 60/DIG. 2 |
| 3,987,624 | 10/1976 | Cooke et al. | 60/448 X |
| 4,082,013 | 4/1978 | Dornfeld et al. | 60/DIG. 2 |
| 4,091,617 | 5/1978 | Cornell | |
| 4,103,489 | 8/1978 | Fletcher et al. | 60/448 X |
| 4,135,365 | 1/1979 | Budzich | 60/445 |
| 4,137,716 | 2/1979 | Budzich | 60/445 |
| 4,158,290 | 6/1979 | Cornell | 60/449 X |
| 4,164,661 | 8/1979 | Hucker et al. | 307/57 |
| 4,180,979 | 10/1979 | Cornell | 60/395 |

OTHER PUBLICATIONS

Klimowicz, *A Hydrostatic Transmission with Electronic Controls Used as a Power Take-off on a Large Articulated Farm Tractor,* pp. 336–339.

Reyonlds et al., *Electronic Constant Output Shaft Speed Control for a Fluid Power Drive,* Sundstrand Corporation Invention Disclosure, from a Book of Papers presented at the National Conference on Fluid Power on or about Sep., 1977.

*Primary Examiner*—Irwin C. Cohen
*Attorney, Agent, or Firm*—Wegner, McCord, Wood & Dalton

[57] ABSTRACT

An electronic constant speed control for a hydrostatic transmission having a variable displacement hydraulic pump with a displacement controlling member movable to various positions at either side of a neutral position and having an input shaft connectable to a prime mover and a hydraulic motor having an output shaft, an electric controller for positioning siad displacement controlling member, a command potentiometer for establishing a set constant speed signal representing a desired constant speed between zero and maximum speed in either direction of rotation for said output shaft, a speed detecting device for establishing a pump input shaft speed signal, a circuit for generating a position control signal representing the required position of the displacement controlling member for the set speed which is responsive to the constant speed and pump input shaft speed signals, a speed detecting device for establishing an output shaft speed signal, a circuit for comparing the output shaft speed signal with said set constant speed signal and integrating any error therebetween and generating a speed error control signal, and a summing circuit for summing said position and speed error control signals to provide a control signal to said electric controller.

16 Claims, 3 Drawing Figures

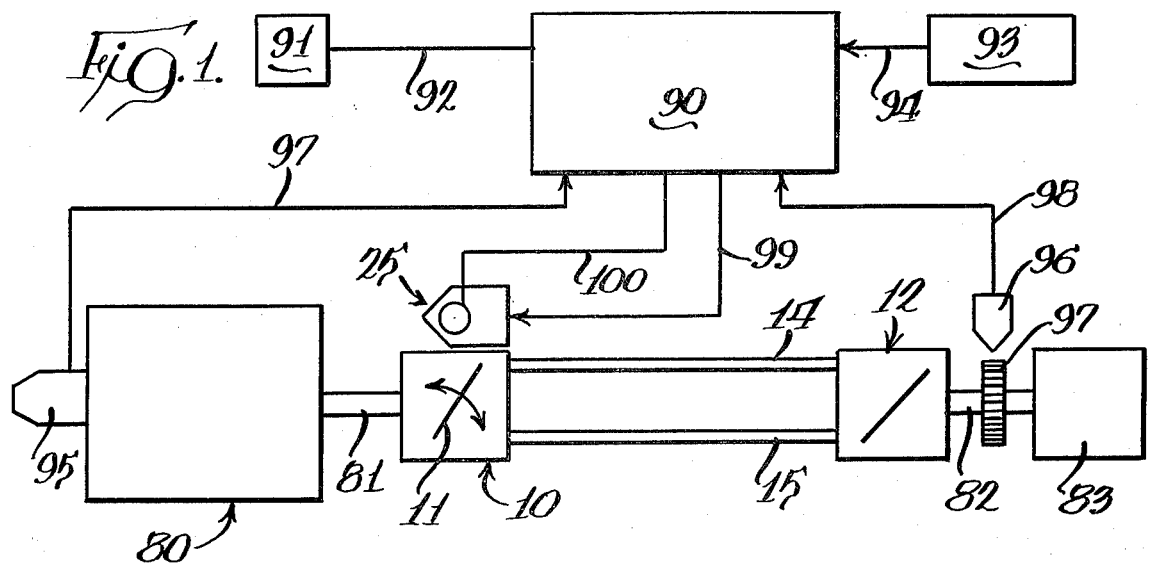
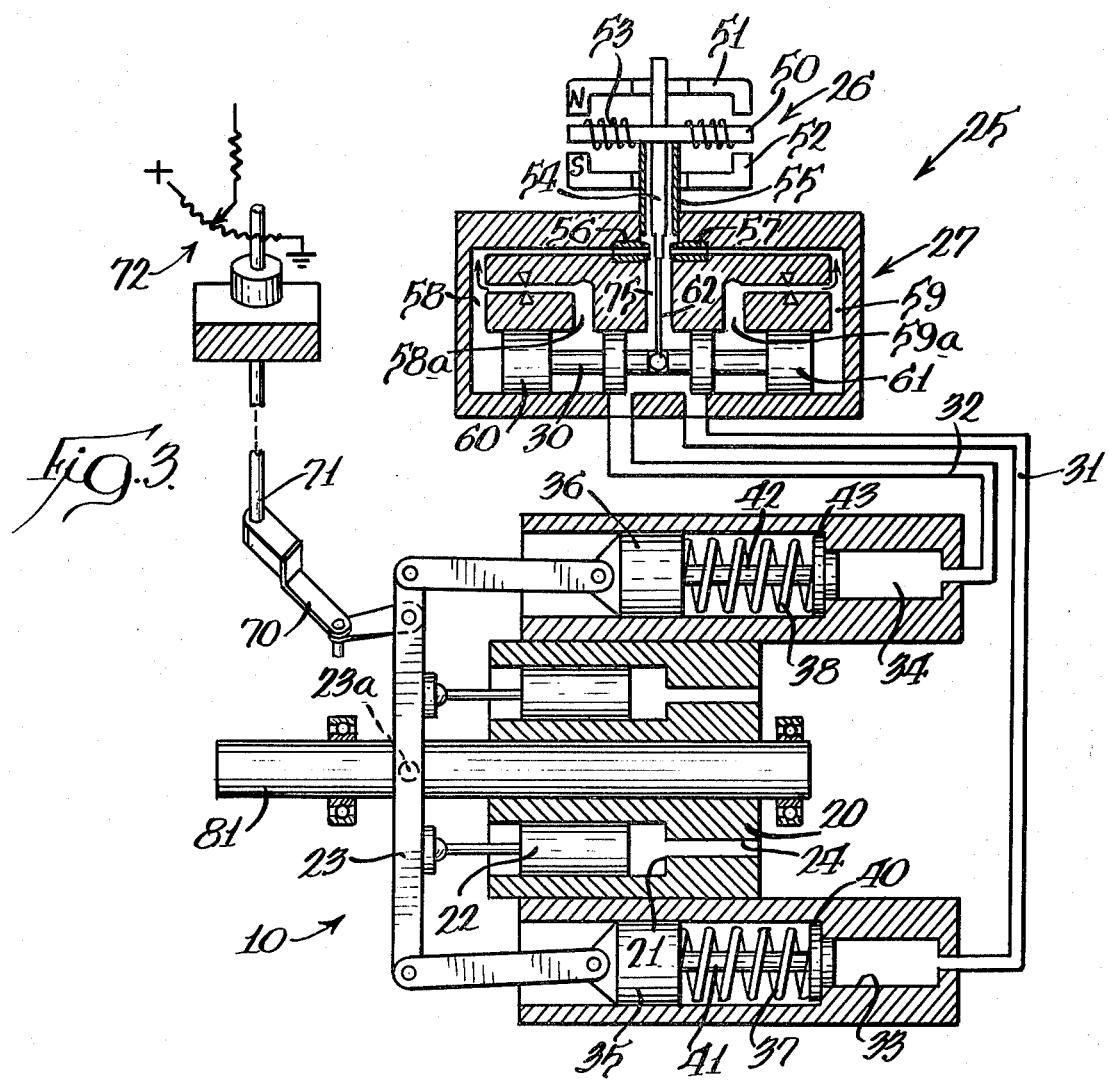

ELECTRONIC CONSTANT SPEED CONTROL FOR A HYDROSTATIC TRANSMISSION

BACKGROUND OF THE INVENTION

This invention relates to an electronic constant speed control for a hydrostatic transmission having an output shaft driven by a hydraulic motor in either direction of rotation thereof and at any speed between zero and a maximum speed, with both open loop and closed loop control of the position of the displacement controlling member of the pump of the hydrostatic transmission.

Electronic constant speed controls for hydrostatic transmissions are known in the prior art. Such controls include those marketed by the assignee of this application, as well as a control offered by a company for the power take-off drive on a large, articulated farm tractor. Additional prior art includes Hawkins U.S. Pat. No. 2,939,285 and Herndon U.S. Pat. No. 3,529,422.

The electronic constant speed control disclosed herein distinguishes from the prior art in having a full range of speed control in either direction of rotation of an output shaft driven by the transmission with both open and closed loop control, with the capability of operating under an open loop control only and with control circuit features optimizing steady state accuracy and transient response, reduction of errors occurring during speed changes of the pump of the hydrostatic transmission, and variable gain for the hydrostatic transmission motor speed feedback circuit to enable accurate operation at very low speeds of said motor. The control includes a provision for operating in a manual open loop mode with automatic switching to said manual mode upon failure of the closed loop portion of the circuit, with prevention of undesirable transients in an error integrator of the closed loop part of the circuit upon switching the electronic control from the manual to automatic mode.

SUMMARY OF THE INVENTION

A primary feature of the invention disclosed herein is to provide an electronic constant speed control for a hydrostatic transmission providing for constant speed control in either direction of rotation of an output shaft driven by the transmission at any set speed between zero and maximum speed, with the electronic control providing for both open and closed loop control from the speed of the transmission pump input shaft and the transmission motor output shaft, respectively, and with improved control circuit features providing for good, steady state accuracy of the output speed at all set speeds and with optimal transient response.

There are many applications for use of a hydrostatic transmission having a variable displacement pump driven by a variable speed prime mover and a motor in circuit with the pump for driving an output shaft at a constant speed. The control disclosed herein enables setting the speed of the output shaft at any speed between zero and a maximum speed in either direction of rotation for said output shaft and which maintains the speed constant, regardless of variations in speed of the pump as driven by the prime mover or variations in the load driven by the transmission.

An object of the invention is to provide an electronic constant speed control providing the results set forth in the preceding paragraph with control features which optimize steady state accuracy and transient response in change of displacement of the hydrostatic transmission pump as well as providing good speed control at all motor speeds and providing for avoidance of undesirable transients in switching from the manual mode to the automatic mode.

BRIEF DESCRIPTION OF THE DRAWING

FIG. 1 is a diagrammatic view of a hydrostatic transmission with the electronic constant speed control associated therewith;

FIG. 3 is a schematic view of the hydraulic pump of the transmission and the displacement control therefor.

DESCRIPTION OF THE PREFERRED EMBODIMENT

Figure 2:
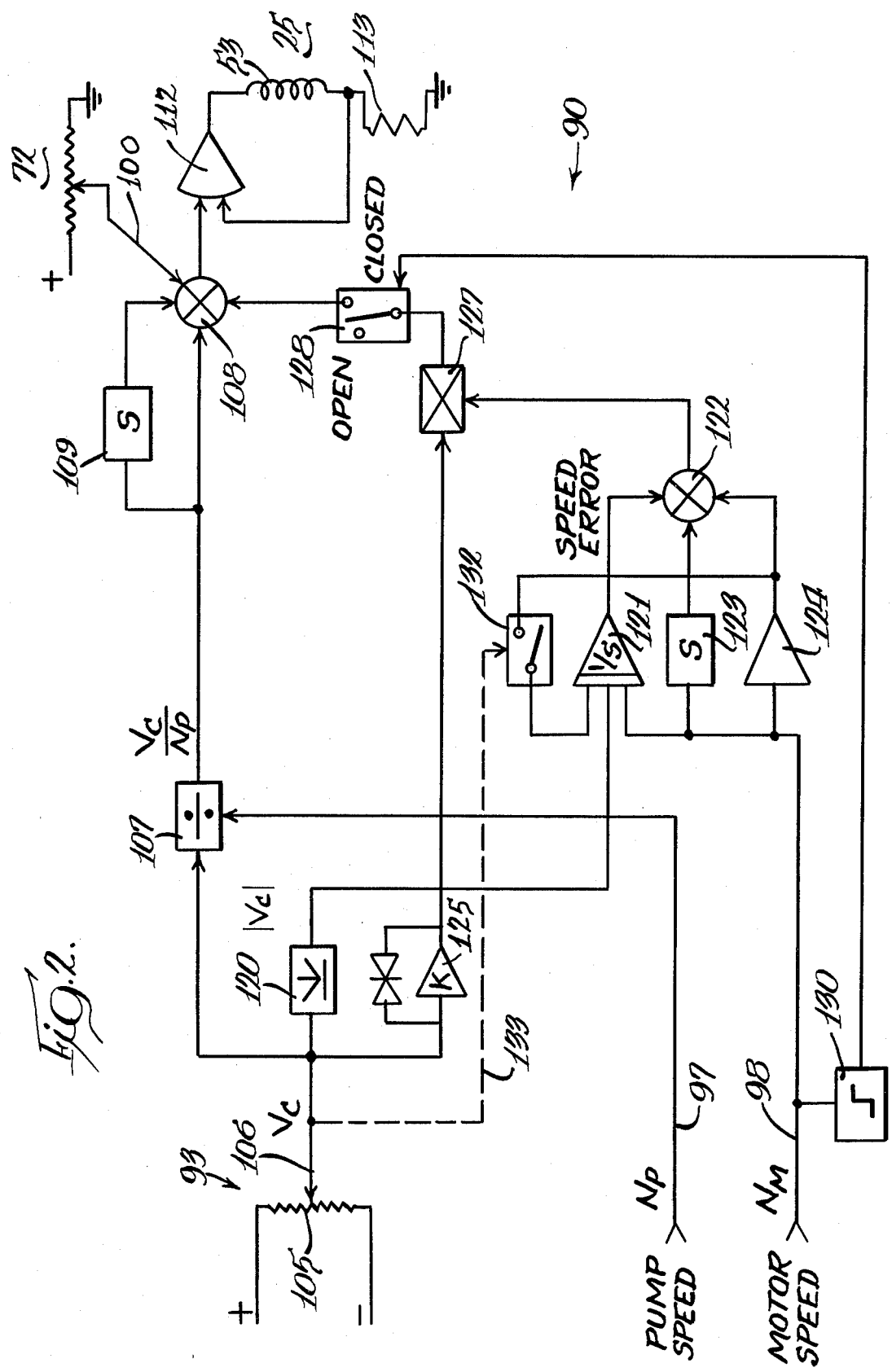
FIG. 2 is a schematic illustration of the electronic constant speed control circuit.

A hydrostatic transmission having an electronic constant speed control associated therewith is shown in FIG. 1. The hydrostatic transmission includes a pump 10, shown in detail in FIG. 3, and having a displacement controlling member in the form of a swash plate 11. The pump is in circuit with a hydraulic motor 12 by means of connecting fluid lines 14 and 15 and with the hydrostatic transmission having associated circuitry, as well known in the art, providing for make-up hydraulic fluid as well as other controls including overpressure relief.

In a preferred embodiment, the pump 10 and motor 12 are axial piston units with the pump 10 (FIG. 3) having a rotating cylinder block 20 with a plurality of cylinders 21 in each of which a pump piston 22 reciprocates under the control of a swash plate 23. Hydraulic fluid from a source can enter a cylinder under the control of a valve plate (not shown) through a cylinder port 24 and during rotation of the cylinder block discharges from the cylinder port in a subsequent rotative position of the cylinder block when the pistons are in stroke, as caused by an inclination of the swash plate 23 from the vertical position shown in FIG. 3.

The position of the swash plate is controlled by an electric controller, indicated generally at 25, which includes a torque motor 26 and a servo valve 27. The servo valve 27 has a valve spool 30 which controls the supply of control pressure fluid to either one of a pair of control lines 31 and 32 which lead to chambers 33 and 34, respectively, in a fixed part of the pump casing. A pair of control pistons, 35 and 36, are located in their respective chambers, 33 and 34, and are urged to neutral positons by respective springs 37 and 38. If a greater pressure exists in chamber 33 than 34, then the pressure will urge the control piston 35 to the left. The control piston 36 will move to the right, as viewed in FIG. 3, as permitted by movement of the piston stem 42 relative to the disc 43 with resulting inclination of the swash plate 23, upwardly toward the right as viewed in FIG. 3. The swash plate is pivotally mounted to the pump casing with a pivot indicated at 23a.

The structure of the torque motor 26 and servo valve 27 are well known in the art and the disclosure thereof in catalog No. 625-1278 of Moog Inc. of East Aurora, N.Y. as well as U.S. Pat. No. 3,023,782 pertaining thereto are incorporated herein by reference. A steady state zero displacement position for the pump is shown in FIG. 3. The torque motor has an armature 50 positioned between pole pieces 51 and 52 and having a coil 53, with the armature connected to a flapper 54 positioned within a flexure tube 55 whereby when the electrical input current to the coil 53 changes, the torque balance at the armature 50 is upset. This causes the flapper 54 to move toward one or the other of the nozzles 56 and 57 whereby control pressure fluid in either of passages 58 and 59 is diverted and caused to act against one of the lands 60 and 61 of the valve spool 30. This results in control pressure fluid flow from one of the passages 58a and 50a (connected to a source of pressure fluid) to one of the control lines 31 or 32 for changing the angle of the swash plate 23 and thus changing the displacement of the pump. As the spool 30 moves, a cantilever spring wire 62 connected to the flapper 54 and the valve spool 30 is deflected and this creates a feedback torque on the flapper that causes displacement of the spool 30 to be proportional to the magnitude of the torque unbalance at the torque motor 26. Feedback to the servo control is derived from a linkage 70 connected to the swash plate 23 which rotates a shaft 71 in response to a change in inclination of the swash plate. The rotation of shaft 71 acts on an electrical potentiometer, indicated generally at 72, which sends a feedback signal to the circuit containing the torque motor coil 53. The feedback signal, as the swash plate 23 approaches the commanded displacement, together with the torque from the cantilevered spring wire 62 causes the flapper 54 to move over towards the opposite of the nozzles 56 and 57 with the result that nozzle flow is diverted to move the valve spool back to its centered position when the commanded displacement is reached. The servo valve 27 in addition to the pressure control fluid passages 58 and 59 has a drain passage 75.

Referring back to FIG. 1, the pump 10 is driven by a variable speed prime mover, indicated generally at 80, with the pump having an input shaft 81 connected to the prime mover. The hydrostatic transmission motor 12 has an output shaft 82 connectable to a load 83.

The electronic constant speed control is indicated at 90 in FIG. 1 and is shown particularly in FIG. 2 and functions to maintain a constant speed of the motor output shaft 82 even though there may be variations in the speed of the prime mover 80. The electronic constant speed control 90 receives primary power from a source 91 through cables 92. A remote operator's station 93 is connected to the speed control 90 through a cable 94.

The operator may select the direction of rotation of shaft 82 and set any speed from zero to maximum in either direction. The electronic control 90 provides for a closed loop operating mode in which the speed of motor 12 is compared with the speed selected by the operator and an open loop mode which is utilized in the event of a malfunction of the motor speed sensor. Speed control 90 receives inputs representing pump speed from prime mover tachometer 95 through line 97 and motor speed from a magnetic pickup 96 through line 98. A pump swash plate position feedback signal on line 100 adds to the accuracy and stability of the system.

The speed control circuit is illustrated in a functional block diagram, FIG. 2. The diagram contemplates and will be described in terms of analog signal processing. A digital control could be used.

At the operator station 93, a potentiometer 105 is connected across a source of positive and negative DC voltage. The operator selects the direction and speed of motor 12 and load 83 by moving the potentiometer slider 106 from its center or neutral position. The polarity of signal $V_c$ represents the direction of the motor and its amplitude represents motor speed. The signal $V_c$ is connected as the numerator input of a divider 107. The denominator is a pump speed signal $N_p$ from the prime mover tachometer. The output of the divider 107, ($V_C/N_P$), is a ratio which represents the pump swash plate angle needed to produce the desired motor speed. The polarity of the command signal, ($V_C/N_P$), represents the direction of displacement of the pump swash plate from neutral and thus the direction the motor turns. The signal ($V_C N_P$) is connected with the summer 108 where it is combined with a command rate signal from circuit 109. The output of summer 108 is connected with servo amplifier 112, the output of which is connected with coil 53 of servo torque motor 26. A signal from potentiometer 72 representing the swash plate angle is connected through line 100 with summing junction 108. A signal representing the amplitude of the servo output current is developed across resistor 113 and connected with another input of amplifier 112 providing feedback to improve stability. The output of amplifier 112 could be used to drive any suitable electromechanical actuator for pump swash plate 11.

The foregoing portion of the circuit provides control in the open loop operating mode. In closed loop operation, the operator's speed command signal is compared with motor speed so that the speed is controlled very precisely.

The signal $V_C$ is connected with a circuit 120 which has an output representing the absolute value $|V_c|$. This signal is one input of an integrator 121. The motor speed $N_M$ from magnetic pickup 96 is connected through line 98 with another input of integrator 121. The output of the integrator represents a time integral of the speed error. This signal is connected with a summer 122 where it is combined with a motor speed rate signal from rate circuit 123 and a signal which is a function of motor speed from scaling circuit 124. The output of summer 122 is connected with a multiplier 127 where it is multiplied by a signal which is a function of the amplitude of the speed command signal $V_C$ from scaling circuit 125. The multiplication factor is a direct function of the amplitude of $V_C$ but is limited at higher levels of $V_C$. The output of multiplier 127 is connected through switch 128 with an input of summer 108.

So long as a motor speed signal $N_M$ is present, as determined by signal detector 130, switch 128 is closed and the system operates in a closed loop mode. In the event of a loss of motor speed signal, as from a malfunction of the magnetic pickup, switch 128 is opened and the control operates in the open loop mode.

When the potentiometer slider 106 is at its neutral position ($V_C=0$), switch 132 is closed through a connection indicated by dashed line 133. The output of scaling amplifier 124, which has an amplitude less than $N_M$ (the gain of amplifier 124 is less than one) is connected with a third input of integrator 121 such that the output of summer 122 is zero. This prevents an undesirable transient condition in the circuit when the operator actuates the potentiometer slider 106 to command operation of the motor.

We claim:

1. An electronic constant speed control in combination with a hydrostatic transmission having a variable displacement hydraulic pump with a displacement controlling member movable to various positions at either side of a neutral position and having an input shaft connectable to a prime mover and a hydraulic motor having an output shaft comprising, an electric controller for positioning said displacement controlling member, means for establishing a set constant speed signal representing a desired constant speed between zero and maximum speed in either direction of rotation for said output shaft, means for establishing a pump input shaft speed signal, means responsive to said constant speed and pump input shaft speed signals for generating a position control signal representing the required position of said displacement controlling member for the set speed, means for establishing an output shaft speed signal, means for comparing said output shaft speed signal with said set constant speed signal and integrating any error therebetween and generating a speed error control signal, and means for summing said position and speed error control signals to provide a control signal to said electric controller.

2. An electronic constant speed control as defined in claim 1 including selectively operable means for preventing delivery of said speed error control signal to said summing means.

3. An electronic constant speed control as defined in claim 2 including means for operating said selectively operable means to prevent delivery of said speed error control signal to said summing means responsive to a failure of said means for establishing an output shaft speed signal.

4. An electronic constant speed control as defined in claim 2 wherein operation of said selectively operable means places said control in an open loop mode of operation for controlling motor speed, and means operable in said open loop mode for setting said integrating means to a zero output.

5. An electronic constant speed control as defined in claim 1 including means for sensing a rate of change in said position control signal and delivering a signal to said summing means which represents said rate of change.

6. An electronic constant speed control as defined in claim 1 including means responsive to said set constant speed signal for modifying the amplitude of said speed error control signal.

7. An electronic constant speed control as defined in claim 1 including a motor speed rate circuit for generating a signal whose magnitude is proportional to the rate of change of motor speed, and a second summing means having the integral of the error between the output shaft speed signal and the desired constant speed signal connected to one input, the output shaft speed signal connected to another input, and the rate of change signal connected to another input, the output of said second summing means being said speed error control signal.

8. An electronic constant speed control as defined in claim 7 including means responsive to said set constant speed signal for modifying the amplitude of said speed error control signal.

9. An electronic constant speed control as defined in claim 1 wherein said electric controller includes a servo valve positionable by an electromechanical actuator to move said pump displacement controlling member, a current driver circuit interposed between said summing means and said actuator and receiving a current feedback signal from the actuator to hold constant current for actuator resistance variations due to heating.

10. An electronic constant speed control in combination with a hydrostatic transmission having a variable displacement hydraulic pump with a displacement controlling member movable to various positions on either side of a neutral position and having an input shaft connectable to a prime mover and a hydraulic motor having an output shaft comprising, an electric controller for positioning said displacement controlling member, means for establishing a set constant speed signal, means for generating a pump input shaft speed signal, means for developing a position signal representing the required position of the displacement controlling member for a selected speed and direction of rotation of said output shaft in response to signals including said pump input shaft speed signal and said set constant speed signal, means for establishing a motor output shaft speed signal, a first summing circuit, means for comparing said set constant speed signal and motor output shaft signal and integrating any error therebetween and generating a first control signal as an input to said first summing circuit, a circuit generating a signal which is a function of motor speed as an input to said first summing circuit, a motor speed rate circuit having an output signal to said first summing circuit whose magnitude is proportional to the rate of change of motor speed, and a second summing circuit receiving said position signal and the output from the first summing circuit and providing a second control signal for said electric controller.

11. An electronic constant speed control in combination with a hydrostatic transmission having a variable displacement hydraulic pump with a displacement controlling member movable to various positions at either side of a neutral position and having an input shaft connectable to a prime mover and a hydraulic motor having an output shaft comprising, an electric controller for positioning said displacement controlling member, means for establishing a first signal representing a set speed and direction of rotation of said output shaft, means for establishing a second signal representing the speed of the pump input shaft, means responsive to said first and second signals for generating a first control signal representing the required position of said displacement controlling member for the set speed and direction of rotation of the output shaft, means for establishing a third signal representing the speed of said output shaft, a first summing circuit, means for comparing said first and third signals and integrating any error therebetween for generating a signal input to said first summing circuit, a circuit generating a signal which is a function of motor speed as an input to said first summing circuit, a motor speed rate circuit having an output signal to said first summing circuit whose magnitude is proportional to the rate of change of motor speed, and a second summing circuit receiving said first control signal and the output from the first summing circuit and providing a control signal for said electric controller.

12. An electronic constant speed control as defined in claim 11 including selectively operable means for preventing delivery of said output from the first summing circuit to said second summing circuit.

13. An electronic constant speed control as defined in claim 12 including means responsive to a failure of said means for establishing the third signal for operating said selectively operable means to prevent delivery of said output from the first summing circuit to said second summing circuit.

14. An electronic constant speed control as defined in claim 12 wherein operation of said selectively operable means places said control in an open loop mode of operation for controlling motor speed, and means operable in said open loop mode for setting said integrating means to a zero output.

15. An electronic constant speed control as defined in claim 11 including means for sensing a rate of change in said first control signal and delivering a signal to said second summing circuit which represents said rate of change.

16. An electronic constant speed control in combination with a hydrostatic transmission, having a variable displacement hydraulic pump with a displacement controlling member movable to various positions on either side of a neutral position and having an input shaft connectable to a prime mover and a hydraulic motor having an output shaft, comprising:

an electric controller for positioning the displacement controlling member;

means for establishing an input signal representing the desired speed and direction of rotation of the motor output shaft;

means for generating a motor output shaft speed signal;

means for comparing the input signal with the motor output shaft speed signal and integrating any error therebetween to develop a speed error signal;

means for scaling the input signal;

means for multiplying the speed error signal with the scaled input signal to generate a first control signal;

means for generating a pump input shaft speed signal;

means for dividing the input signal by the pump input shaft speed signal to derive a second control signal representing the required position of the displacement controlling member for the desired speed and direction of rotation of the output shaft;

means for generating a third signal representing the position of the displacement controlling member; and means for combining the first and second control signals with the third signal to develop a signal for controlling the electric controller.

* * * * *